US007249290B2

(12) United States Patent
Takei et al.

(10) Patent No.: US 7,249,290 B2
(45) Date of Patent: Jul. 24, 2007

(54) DESKEW CIRCUIT AND DISK ARRAY CONTROL DEVICE USING THE DESKEW CIRCUIT, AND DESKEW METHOD

(75) Inventors: Yuji Takei, Odawara (JP); Seiichi Abe, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/244,288

(22) Filed: Oct. 6, 2005

(65) Prior Publication Data

US 2006/0036915 A1 Feb. 16, 2006

Related U.S. Application Data

(63) Continuation of application No. 10/431,893, filed on May 8, 2003, now Pat. No. 6,978,403.

(30) Foreign Application Priority Data

Oct. 7, 2002 (JP) ............................. 2002-293276

(51) Int. Cl.
*G11B 5/00* (2006.01)
(52) U.S. Cl. ....................... 714/700; 714/744
(58) Field of Classification Search ................ 714/700, 714/744
See application file for complete search history.

(56) References Cited

U.S. PATENT DOCUMENTS

| 4,881,165 A | 11/1989 | Sager et al. |
| 5,122,679 A | 6/1992 | Ishii et al. |
| 5,265,243 A * | 11/1993 | Povenmire et al. ........... 710/62 |
| 5,386,517 A * | 1/1995 | Sheth et al. .................. 710/60 |
| 5,432,823 A | 7/1995 | Gasbarro et al. |
| 5,467,464 A | 11/1995 | Oprescu et al. |
| 5,486,783 A | 1/1996 | Baumert et al. |
| 5,726,990 A | 3/1998 | Shimada et al. ............ 370/536 |
| 5,796,795 A | 8/1998 | Mussman et al. |
| 5,825,226 A * | 10/1998 | Ferraiolo et al. ........... 327/250 |

(Continued)

FOREIGN PATENT DOCUMENTS

JP 11355258 12/1999

(Continued)

OTHER PUBLICATIONS

Harris, et al, IEEE, Statistical Clock Skew Modeling with data delay Variations, Dec. 2001, #7166789.

(Continued)

*Primary Examiner*—Guy Lamarre
*Assistant Examiner*—Mujtaba K. Chaudry
(74) *Attorney, Agent, or Firm*—Mattingly, Stanger, Malur & Brundidge, P.C.

(57) ABSTRACT

A deskew circuit includes, for clock and every bit of data, a variable delay circuit between a receiver that receives data and a flip-flop that first latches the data, in which a detecting pattern to detect a stable region for receiving data is repeatedly sent before implementing a data transfer, a delay value with which the starting edge an ending edge of the data match the rising edge of the clock is found for the variable delay circuit, and a delay value with which the transfer data can be received in a stable manner is set based on the delay value of the variable delay circuit.

12 Claims, 11 Drawing Sheets

U.S. PATENT DOCUMENTS

| | | | |
|---|---|---|---|
| 5,898,242 A | 4/1999 | Peterson | 327/278 |
| 5,926,837 A | 7/1999 | Watanabe et al. | |
| 6,044,121 A | 3/2000 | Nolan et al. | |
| 6,079,035 A | 6/2000 | Suzuki et al. | |
| 6,118,297 A | 9/2000 | Schenck | 326/35 |
| 6,157,229 A | 12/2000 | Yoshikawa | |
| 6,294,937 B1 | 9/2001 | Crafts et al. | |
| 6,377,079 B1 | 4/2002 | Fiedler | |
| 6,452,421 B2 | 9/2002 | Saito | |
| 6,484,268 B2 | 11/2002 | Tamura et al. | 713/600 |
| 6,499,111 B2 | 12/2002 | Mullarkey | |
| 6,504,415 B1 | 1/2003 | Robinson et al. | |
| 6,535,400 B2 | 3/2003 | Bridge | 363/21.06 |
| 6,557,066 B1 | 4/2003 | Crafts et al. | |
| 6,625,675 B2 | 9/2003 | Mann | |
| 6,636,993 B1 | 10/2003 | Koyanagi et al. | |
| 6,757,327 B1 | 6/2004 | Fiedler | 375/232 |
| 6,765,423 B2 | 7/2004 | Higuchi | 327/270 |
| 6,879,651 B2 | 4/2005 | Saeki | |
| 6,934,049 B1 * | 8/2005 | Yamada | 358/1.16 |
| 2002/0138675 A1 | 9/2002 | Mann | |
| 2002/0184552 A1 | 12/2002 | Evoy et al. | |
| 2003/0014683 A1 | 1/2003 | Deas et al. | |
| 2003/0046598 A1 | 3/2003 | Crafts | |
| 2003/0074609 A1 | 4/2003 | Koyanagi et al. | |
| 2003/0188234 A1 | 10/2003 | Casper et al. | |
| 2004/0030964 A1 | 2/2004 | Slutz et al. | |

FOREIGN PATENT DOCUMENTS

| | | |
|---|---|---|
| JP | 2000196571 | 7/2000 |
| JP | 2001251283 | 9/2001 |
| JP | 2002007322 | 1/2002 |

OTHER PUBLICATIONS

Yoo, IEEE, An Open-loop Clock Deskewing Circuit for High-speed Synchronous DRAM, Jan. 2003, #7511835.

IBM TDB, Deskewing System for Parallel Recorded Data, Jun. 1967.

* cited by examiner

Pattern 1

Repeating data
Clock a

Pattern 2

Repeating data

Clock b

At the time of data transfer

Transferred data

Clock a
Clock b

US 7,249,290 B2

DESKEW CIRCUIT AND DISK ARRAY CONTROL DEVICE USING THE DESKEW CIRCUIT, AND DESKEW METHOD

The present application is a continuation of application Ser. No. 10/431,893, filed May 8, 2003 now U.S. Pat. No. 6,978,403, the contents of which are incorporated herein by reference.

BACKGROUND OF THE INVENTION

The present invention relates to a deskew circuit and a deskew method that corrects skews between clock and data, as well as among data on a data bus, in data transfers to transfer large volume data between packages at high-speed and to transfer clock and data in parallel.

A conventional technology that transmits data at high-speed while taking data skew into consideration has been indicated. In such a technology, a delay amount for every bit in data on the receiving side is adjusted using a phase adjustment pattern. However, phases are matched to an external clock supplied to both the transmitting and receiving sides, and the technology therefore is not a method to transfer clock and data in parallel.

The conventional technology involves a method of adjusting only the clock in devices such as disk array control devices in which there is a large skew in a backplane due to the large number of packages and in which a high-speed transfer must be implemented in a data transfer method that transfers clock and data (bus data) in parallel in order to reduce power consumption. Although this method is effective when the transfer speed is slow and data pulse width is wide, it is difficult to correct the clock to a position that allows all data to be read correctly when the transfer speed is fast and the data pulse width is narrow. This becomes even more difficult when taking into consideration the junction temperature fluctuations of an LSI that has a built-in circuit that makes such an adjustment, power source voltage fluctuations, flip flop set-up time and hold time. Further, the skew is small and the clock can be corrected when the transmission distance is short (e.g., approximately 10 cm–20 cm), such as when sending and receiving within the same substrate (package). However, the skew is larger and correcting the dock become very difficult when the transmission distance is long (e.g., approximately dozens to 100 cm), such as in a backplane. Skew adjustment becomes difficult when the transmission distance is long as in a backplane, and this also sets a limit to the transfer speed and makes high-speed transfer impossible.

SUMMARY OF THE INVENTION

The present invention relates to a deskew control method and a deskew control system that transfer data and clock in parallel and that make high-speed transfer possible when the transmission line is long and the skew is large, such as when transmitting via a backplane.

In accordance with an embodiment of the present invention, for clock and every bit of data, a variable delay circuit is provided between a receiver that receives data and a flip-flop that first latches the data, a detecting pattern to detect a stable region for receiving data is repeatedly sent before implementing a data transfer, and a delay value that ensures data to set for each variable delay circuit.

Other features and advantages of the invention will be apparent from the following detailed description, taken in conjunction with the accompanying drawings that illustrate, by way of example, various features of embodiments of the invention.

PREFERRED EMBODIMENTS

Next, preferred embodiments of the present invention will be described in detail with reference to the accompanying drawings.

Figure 1:
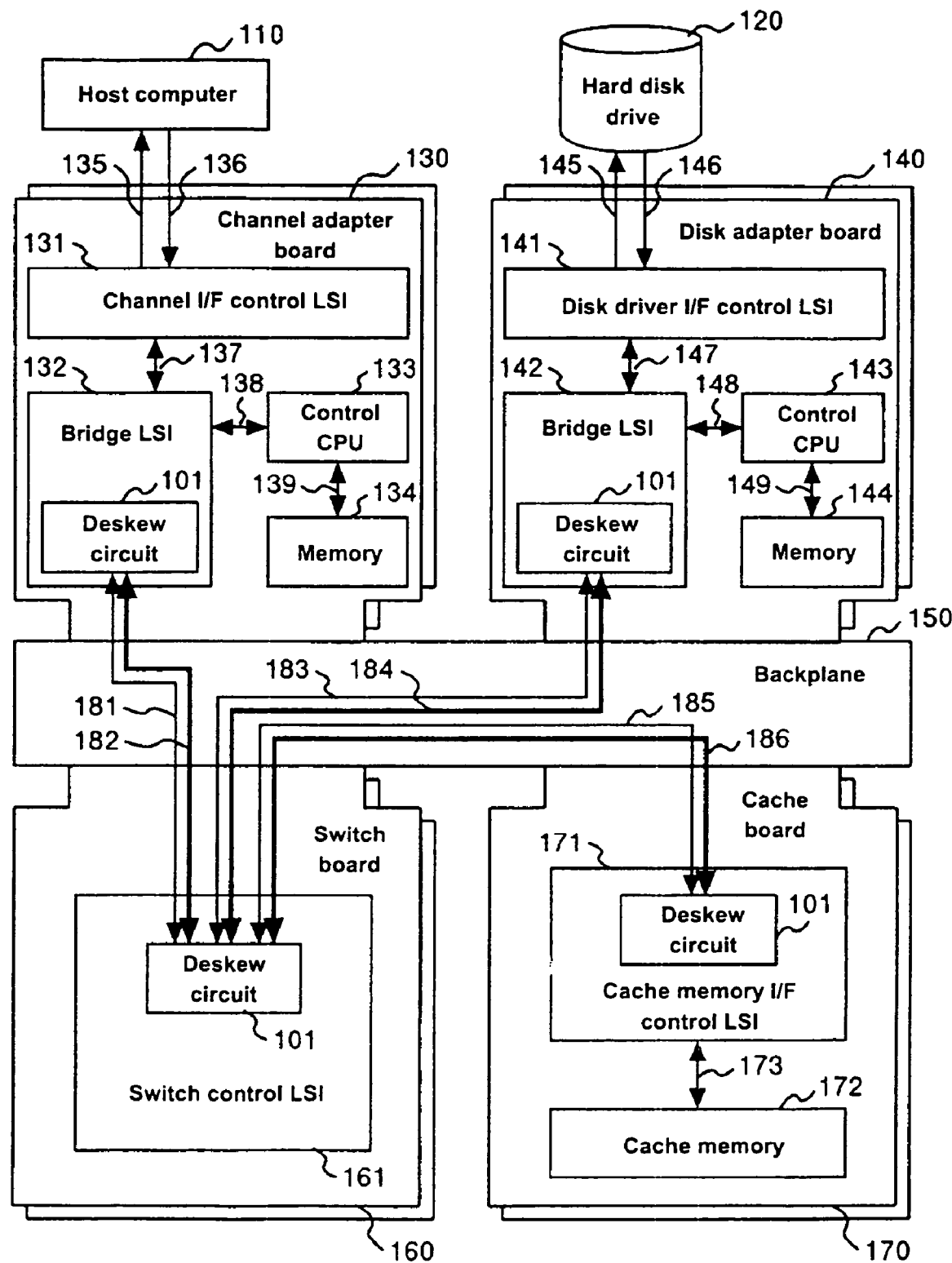
FIG. 1 shows a block diagram of a disk array device in accordance with one embodiment of the present invention.

FIG. 1 is a block diagram of a disk array control device in accordance with one embodiment of the present invention. The disk array control device is formed from a plurality of channel adapter boards 130 that control interface with a host computer 110, a plurality of disk adapter boards 140 that control interface with a hard disk drive 120, a plurality of switch boards 160 that control switching of data transfers between boards, and a cache board 170 that controls interface with a cache memory that temporarily retains data. The disk array control device connects the switch boards 160 with the channel adapter boards 130, the switch boards 160 with the disk adapter boards 140, and the switch boards 160 with the cache board 170, each via a backplane 150 and with clock signals 181, 183 and 185, respectively, and command data buses 182, 184 and 186, respectively. Each channel adapter board 130 consists of a channel interface control LSI 131, a bridge LSI 132, a control CPU section 133 and a memory 134; each disk adapter board 140 consists of a disk interface control LSI 141, a bridge LSI 142, a control CPU section 143 and a memory 144; each switch board 160 consists of a switch control LSI 161; and the cache board 170 consists of a cache memory I/F control LSI 171 and a cache memory 172. In this disk array control device, there is a plurality of packages to provide redundancy; since this causes the wiring distance in the backplane 150 to be long, skews can be large.

In a device such as this, a clock signal is transferred with data only when it is necessary to reduce power consumption. Further, in high-speed data transfers, skews between data and clock in a relatively short distance that were managed until now by a clock margin become a problem.

For this reason, a deskew circuit 101 is provided in each of the bridge LSIs 132, the bridge LSIs 142, the switch control LSIs 161 and the cache memory I/F control LSI 171, which are involved in data transfer through the backplane 150.

Figure 2:
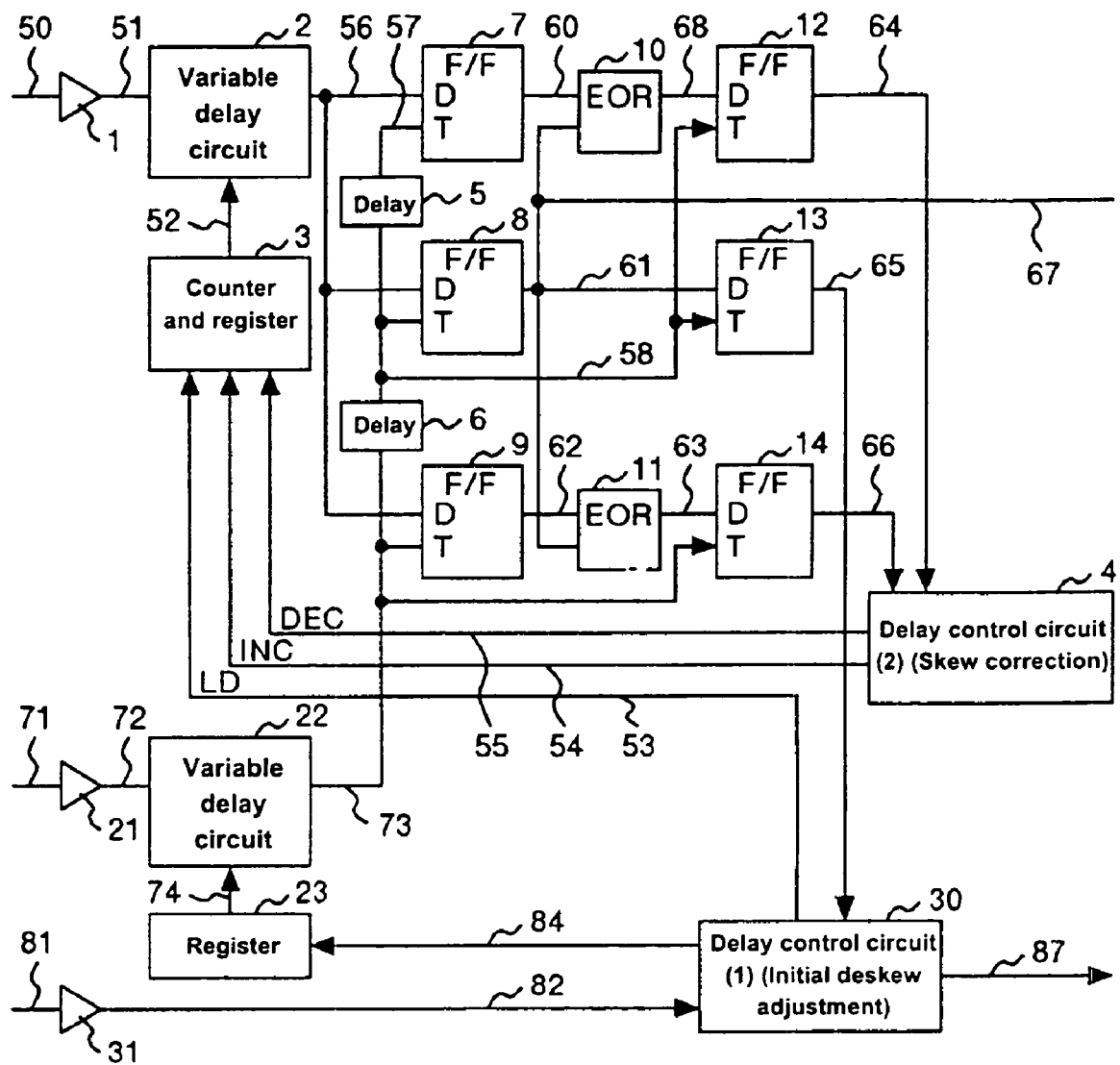
FIG. 2 shows a diagram of a single-phase clock parallel transfer-type deskew circuit in accordance with one embodiment of the present invention.

FIG. 2 is a circuit diagram of the deskew circuit 101 in accordance with one embodiment of the present invention. The present embodiment shows one line (equivalent to one bit) in a data bus 50. Other lines for data are identical to this line and therefore not shown. Data from the data bus 50 and a clock signal 71 from a clock signal line are outputted together from a transmitting side. On the receiving side, data is read based on the data signal and the clock signal received. In this process, a difference develops in delay time between data signals and between the data signal and the clock signal, which becomes a skew. The present invention adjusts such a skew.

Figure 5:
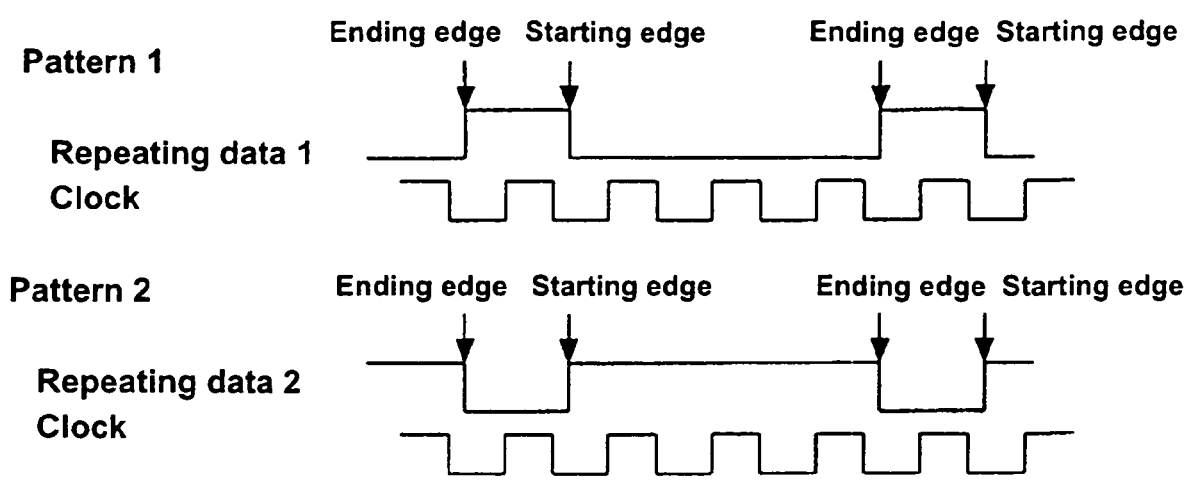
FIG. 5 shows a diagram of deskew adjustment patterns for a single-phase be read is clock in accordance with one embodiment of the present invention.

First, the overall operation of the circuit will be described. An initial skew correction takes place prior to a data transfer. In the initial skew correction, data for skew correction, which includes a predetermined test pattern as those shown in FIG. 5, is transferred. First, adjustments are made repeatedly so that for data in every data line the rising edge of the clock is later than the falling edge of the data. In other words, adjustments are made so that the delay in the clock's rising edge is larger than the falling edge of a data bit having the largest delay. This is to make it possible to detect rising and falling positions of data, as described later. The initial delay value of a variable delay circuit 22, or the delay value of the clock, is established in this way. One bit on the data bus goes through a data input buffer 1 and is provided to a variable delay circuit 2 as an internal data input signal 51. In the meantime, the clock signal 71 goes through a clock input buffer 21 and is provided to the variable delay circuit 22 as an internal clock input signal 72.

After the initial delay value of the variable delay circuit 22 is established, a small delay (the smallest unit of delay adjustment or a larger delay amount) is added to each bit of every signal line for data to find a delay amount that will cause the data's falling edge and rising edge to match the clock's rising edge: More specifically, when a cycle and a delay value with which "1" is detected for the first time become clear, whether "1" can be detected a plurality of times in a stable manner is checked to confirm that an output from a flip-flop 8 is not metastable and that the delay value is not affected by clock jitters. If "1" cannot be received in a stable manner, the delay value is increased or decreased until a delay value with which "1", can be received in a stable manner is found and established as REGD 1. This is done by outputting an adjustment value from a delay control circuit (1) 30, and the value is added to a counter and register 3 in order to control the variable delay circuit 2. Next, the transmitting side sends repeating data 2 and clock of pattern 2. After confirming the transmission of pattern 2, the delay control circuit (1) 30 sets a delay value signal 53 as the delay value REGD 1 and checks whether "0" can be detected in a stable manner in the applicable cycle. If "0" cannot be detected, the delay value is increased until a delay value with which "0" can be received in a stable manner is found, and the delay value RE3D 1 is changed and established. This concludes the detection of the starting edge.

Next, in order to detect the ending edge, the transmitting side continues sending the repeating data 2 and clock of pattern 2. The variable delay value for data is increased and a cycle with which "1" can be detected is searched. When a cycle and a delay value with which "1" is detected for the first time become clear, whether "1" can be detected a plurality of times in a stable manner is checked to confirm that an output from a flip-flop 13 is not metastable and that the delay value is not affected by clock jitters. If "1" cannot be received in a stable manner, the delay value is increased or decreased until a delay value with which "0", can be received in a stable manner is found and established as REGD 2.

Next, the transmitting side again sends the repeating data 1 and clock of pattern 1. After confirming the transmission of pattern 1, the delay control circuit (1) 30 sets the delay value signal 53 as the delay value REGD 2 and checks whether "1" can be detected in a stable manner in the applicable cycle. If "1" cannot be detected, the delay value is increased until a delay value with which "1" can be received in a stable manner is found, and the delay value REGD 2 is changed and established. This concludes the detection of the ending edge.

The delay value of a midpoint between the starting edge and the ending edge is calculated through an operation based on the delay value REGD 1 of the starting edge and the delay value REGD 2 of the ending edge detected. The midpoint delay value is set as the delay signal 53. Next, a request to transfer a random pattern is made to the transmitting side in order to check that the transmitting pattern and the receiving pattern match and that the data can be received in a stable and correct manner. This establishes that data can be received in a stable manner with the applicable delay value, and the delay value signal 53 is set as the delay value that can ensure some margin. This completes the delay adjustment and synchronizes a data signal 56 with a clock 58, which makes a delay adjustment completion signal 87 valid. This completes the delay adjustment in one direction.

Based on this result, a delay is added to the data through the variable delay circuit 2 so that the midpoint between falling and rising positions of the data, which is an output 67 from the flip-flop 8, matches the rising of the clock. This delay value is an average value of the delay value with which the falling of the data matches the rising of the clock and the delay value with which the rising of the data matches the rising of the clock. This realizes the initial skew adjustment.

Next, the transmitting side invalidates a skew adjustment beginning signal 81, and if the deskew processing ended normally, the deskew control circuit on the side that first received the skew adjustment beginning signal 81 makes it valid and performs a deskew adjustment in the other direction. If the skew adjustment cannot be made, the skew adjustment beginning signal 81 remains valid and the deskew control circuit that first received it notifies the side that first transmitted the skew adjustment beginning signal 81 that the deskew did not end normally.

Next, a description will be made as to the processing that takes place when deskew conditions change due to temperature fluctuations and/or power source voltage fluctuations during operation. A clock signal 73, which is an output 73 of the variable delay circuit 22, is provided unaltered to a flip-flop (hereinafter abbreviated "F/F") 9, the clock signal 73 with a delay 6 added is provided to the F/F 8, and the clock signal 73 with a delay 5 further added is provided to an F/F 7. As a result, outputs 62, 61 and 60 of the F/Fs 9, 8 and 7, respectively, have a relationship as represented by a, b and c, respectively, in FIG. 3.

The output 62(*a*) of the F/F 9 and the output 61(*b*) of the F/F 8 are provided to an EOR (exclusive OR) 11. When there is a relationship in which a is "C" and b is "1," an output of the EOR 11 becomes "1" and an output of an F/F 14 becomes "1" which indicates that the phase of the data is later than that of the clock. In this case, the variable delay circuit 2 is adjusted to increase the delay amount of the data.

On the other hand, the output 60 of the F/F 7 and the output 61 of the F/F 8 are provided to an EOR 10. When there is a relationship in which c is "0" and b is "1," an output of the EOR 10 becomes "1" and an output of an F/F 12 becomes "1," which indicates that the phase of the data is earlier than that of the clock. In this case, the variable delay circuit 2 delay amount of the data.

The above concludes the description of the circuit configuration shown in FIG. 2 and its overall operations. Next, main points will be described in further detail.

The variable delay circuit 2 is placed between the input buffer and the F/Fs 7, 8 and 9 that first latch data, and the data 61 that has been skew-adjusted is outputted from the F/F 8. Since the input data 56 and the input clock 58 are asynchronous until the delay control circuit (1) 30 outputs the correct delay value signal 53, the output signal 61 from the F/F 8 remains in a metastable state (i.e., an unstable state in which it cannot be determined whether data is high level or low level). For this reason, an output 65 of the F/F 13, whose output is stable, is inputted into the delay control circuit (1) 30; this allows the delay control circuit (1) 30 to establish, based on the data made available from the input of the output 65, the correct delay value signal 53 when a skew adjustment control is performed.

Figure 3:
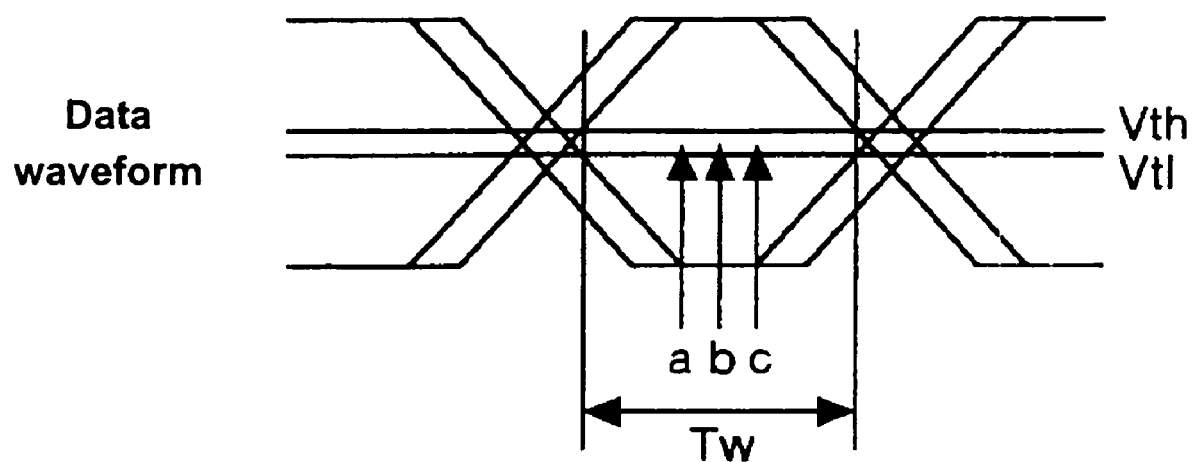
FIG. 3 shows a diagram of receiving waveform in accordance with one embodiment of the present invention.
Figure 4:
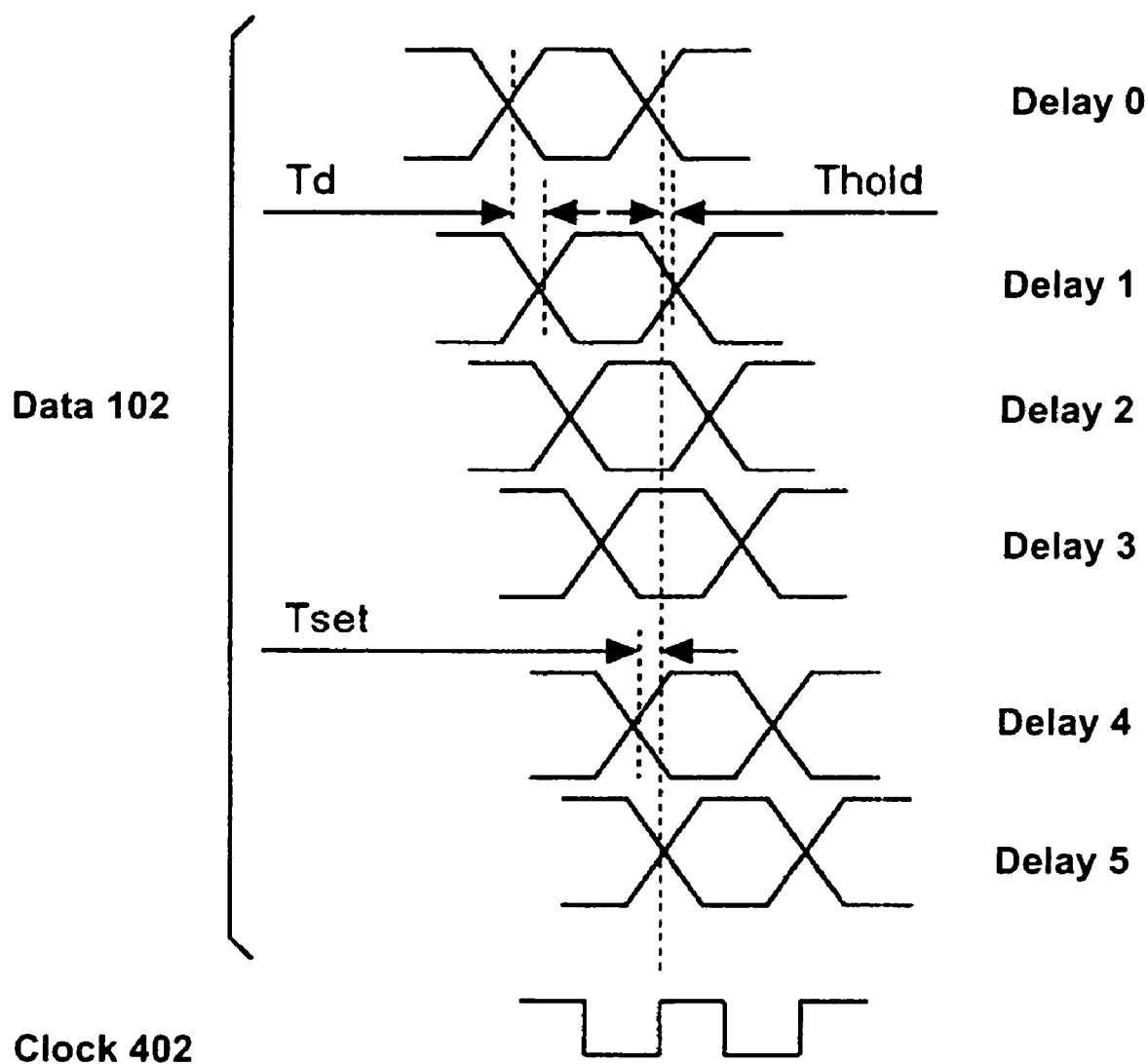
FIG. 4 shows a timing diagram of clock and data operations in accordance with one embodiment of the present invention.

Next, the skew adjustment control of the clock 71 and the command data bus 50 by the delay control circuit (1) 30 in the deskew circuit is described. FIG. 3 is an I waveform showing a reception waveform, overlapped repeatedly for each data transfer, of the command data bus 50 that is inputted into the receiver buffer 1. The waveform contains jitters caused by noise and is able to receive signals in a stable manner only for a window time Tw. FIG. 4 is a waveform diagram of the timing required to receive signals in a stable manner as a result of variable delays. A margin for the difference between a skew adjustment time and a window time in an actual data transfer must be secured; since a delay value that allows data to be received requires the three values a, b and c in FIG. 3, the window time Tw required at minimum can be calculated using the formula below based on a maximum delay value Td of the smallest unit of adjustment for the variable delay circuit, a setup time (i.e., the time in which data must be established until the clock arrives) Tset of the F/F 8, and a hold time (i.e., the time during which a certain level must be maintained) Thold:

$$Tw > 3Td \pm Tset + Thold$$

Consequently, the maximum delay value Td of the smallest unit of delay adjustment for the variable delay circuit must be less than approximately one third of the window time Tw.

Figure 6:
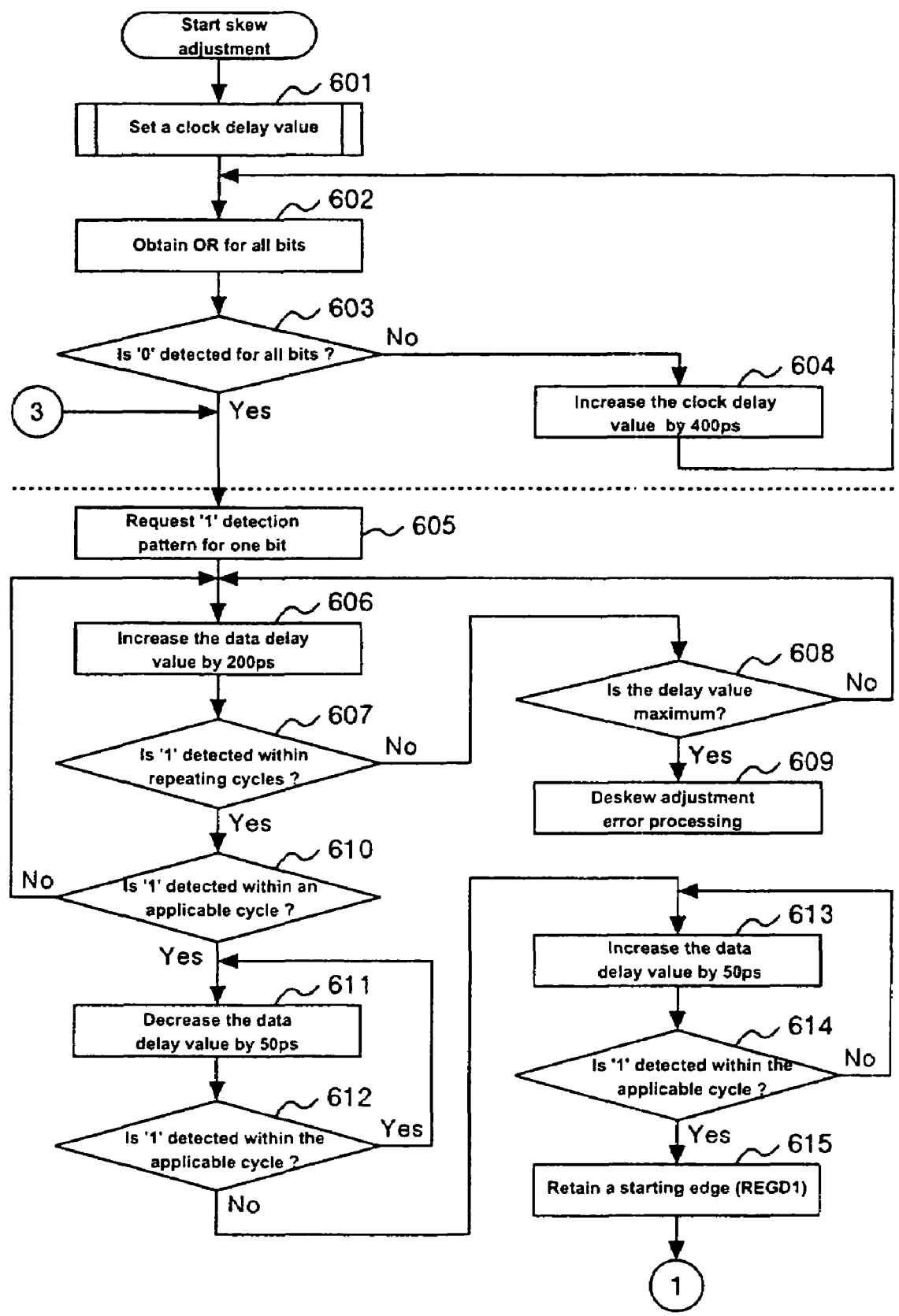
FIG. 6 shows a control flowchart for deskew adjustment in accordance with one embodiment of the present invention.
Figure 7:
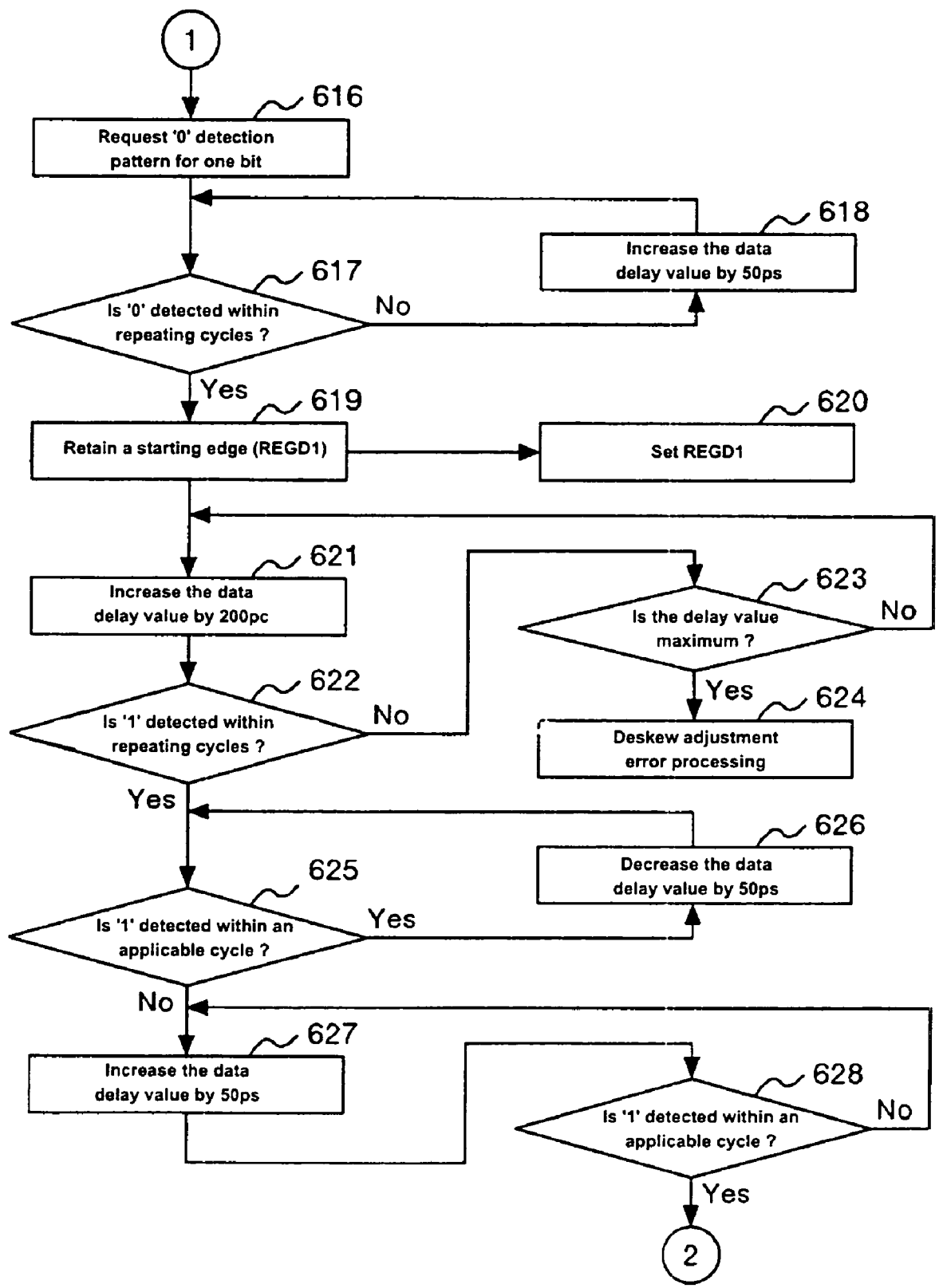
FIG. 7 shows a control flowchart for deskew adjustment in accordance with one embodiment of the present invention.
Figure 8:
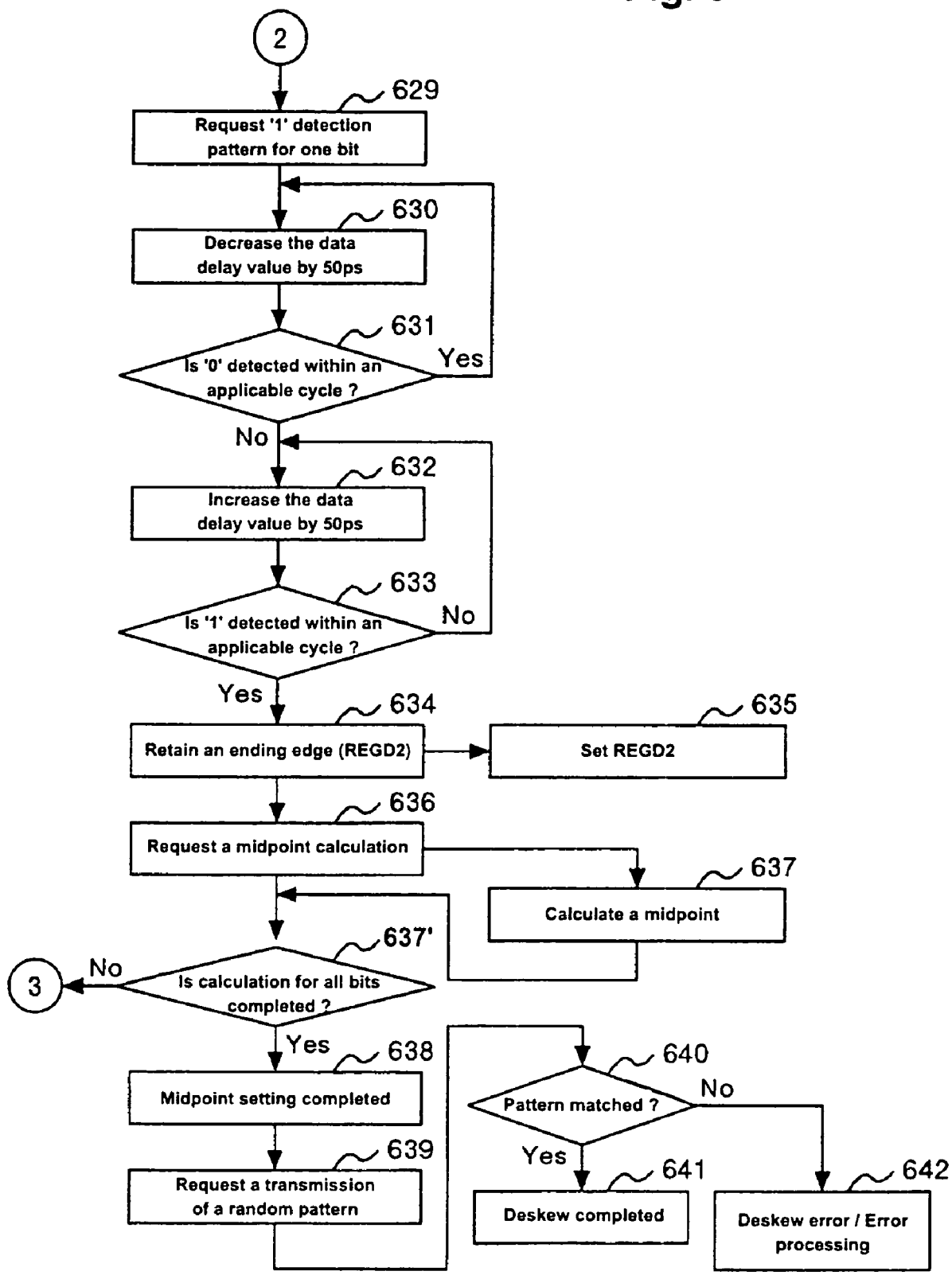
FIG. 8 shows a control flowchart for deskew adjustment in accordance with one embodiment of the present invention.

Patterns for detecting the delay value of the variable delay circuit are indicated in FIG. 5, and the flow of control is indicated in FIG. 6. The transmitting side repeatedly sends pattern 1 in FIG. 5 and at the same time makes valid the skew adjustment beginning signal 81 in FIG. 2. When the skew adjustment beginning signal 81 becomes valid, the delay control circuit (1) 30 implements the control according to the flow in FIG. 6.

Next, the flow of operations performed by the delay control circuit (1) 30 will be described with reference to FIG. 6. First, a clock delay is set to approximately one-half of data duty (601). This is to set the rising edge of the clock in general proximity of the data's falling edge. The repeating data 1 and clock of the pattern 1 shown in FIG. 5 are sent from the transmitting side to check whether "1" can be detected. If it is detected, it indicates that the clock's rising edge is somewhere between the starting and the ending edge of the data, which makes it impossible to detect the starting edge of the repeating data 1 in the applicable cycle. If "0" is detected, it indicates that the clock's rising edge is in a phase earlier than the data's. If the clock's rising edge is in a phase earlier than the data's for all data bits, i.e., if "0" is detected for all bits, positions of the data's rising edge and falling edge can be detected by changing only the delay value for the data and keeping the delay value of the clock fixed.

OR of the detected value for all data bits is obtained (602). If there is even one bit whose data is not "0" (603 No), further delay is added to the clock (604). In this way, detection of "1" continues while the delay value of the variable delay circuit 22 of the clock is increased in the next cycle and is repeated until "1" is no longer detected. As described earlier, the clock's delay value is set in this way (603). The processing to determine the clock's delay value ends at the dotted line in FIG. 6.

Next, a request is made to the transmission source to transfer pattern 1 in FIG. 5 consecutively (605). The delay value of the variable delay circuit 2 is increased by only 200 ps, for example, to increase the delay value of the data (603). Whether "1" is detected within the repeating cycles of the data is determined (607). If "1" is not detected, it indicates that the data's rising (starting) has not reached the clock's rising; consequently, if the delay value is not at maximum (608 No), the processing returns to step 606. If the delay value is at maximum (608 Yes), an error is displayed (609).

If "1" is detected (607 Yes), whether "1" is detected within the one applicable cycle is determined (610). If it is not detected, the processing returns to step 606. If it is detected, it indicates that there is a possibility that the data's phase is too early; consequently, the data delay value is reduced by, for example, 50 ps (which is the smallest unit of delay adjustment in this example) (611). This is repeated until "1" is no longer detected (611, 612). Since no longer detecting "1" indicates that the data's delay has been reduced too much, the data's delay is increased by 50 ps (613); if this causes "1" to be detected (614), it indicates that the clock's edge matches the data's starting edge and the current delay value is retained as the delay value for the data's starting edge (615).

Next, a request is made to transfer the data of pattern 2 in FIG. 5 (616). If "0" is not detected, the data's delay is increased by 50 ps (618); if "0" is detected, the data's delay is retained unaltered (619). This value becomes set as the position of the starting edge (620). This concludes the detection of the starting edge.

Next, the processing to detect the ending edge begins. As data of pattern 2 in FIG. 5 is received, the delay value of the data is increased by only 200 ps (619). If "1" is not detected within repeating cycles (622 No), the processing returns to step 621 unless the delay value reaches the maximum (623). If the delay value is the maximum possible delay value for the variable delay circuit 2, a deskew adjustment error processing is performed (624). If "1" is detected, whether "1" is detected within the applicable cycle is determined (625), and the data delay value is decreased by 50 ps in each cycle as long as "1" continues to be detected (626). If "1" is no longer detected, the data delay value is increased by only 50 ps (627). If "1" is detected in the applicable cycle, the current delay value becomes the ending of data of pattern 2 (628).

After this, a request is made to transfer data of pattern 1 in FIG. 5 (629). The data delay value is decreased by only 50 ps (630); and if "0" is detected in the applicable cycle the processing returns to step 630 (631 Yes). If "0" is not detected, it indicates that the clock's phase is slightly earlier; consequently, the data delay value is increased by only 50 ps to allow the data's phase to advance (632). If this causes "1" to be detected (633 Yes), the delay value of the data at this point is retained as the ending edge (634). This becomes set as the position of the ending edge (REGD 2) (635). If "1" is not detected in step 633, the processing returns to step 632. Next, a request is made to perform an operation to calculate the midpoint between the starting edge and ending edge (636), and a data delay value at the midpoint is sought (637). To find the data delay value at the midpoint means to determine a data delay value that positions the data and the clock in a relationship in which the clock's rising edge is placed at the center of the data's cycle.

The above steps determine the data delay value for one bit on the data bus, and a similar processing takes place for the next data bit starting at ③ in FIG. 6. To simplify the description, the processing was described to be performed serially on each data bit, but a part or all of the processing may be performed in parallel. When the operation to calculate the midpoint finishes for all bits (6379, the midpoint setting is completed (638). At this point, instead of data with a repeating pattern as in FIG. 5, data with a random pattern is requested to be transferred (639). Since the random pattern data is nevertheless data in a test pattern for deskewing purposes, the pattern sent is a predetermined one. Consequently, the random pattern allows a determination to be made as to whether the transmitted pattern and the receiving pattern match (640). If they match, deskewing is considered completed (641). If they do not match, it is a deskew error and an error processing is performed (642).

According to the disk array control device in FIG. 1, a data transfer takes place between the channel adapter boards 130 and the switch boards 160, between the disk adapter boards 140 and the switch boards 160, or between the cache board 170 and the switch boards 160, in which a skew adjustment is first made on a data transfer from the channel adapter boards 130, the disk adapter boards 140 or the cache board 170 to the switch boards 160. Next, a skew adjustment is made on a data transfer from the switch boards 160 to the channel adapter boards 130, the disk adapter boards 140 or the cache board 170.

These skew adjustments are made after a power-on reset is released (i.e., when a processing to reset F/Fs and registers at power-on is completed) or based on an instruction from the CPUs 133 of the channel adapter boards 130 or the CPUs 143 of the disk adapter boards 140. To prevent data transfers from exceeding the margin of difference between a skew-adjusted state and the window time in actual data transfers, Skews are readjusted when a CPU fails to end normally and a retry is attempted or when there are environmental changes in temperature or power source due to passage of time.

Further, when there is a possibility that transfer data cannot be received correctly due to an LSI's junction temperature fluctuations and/or power source voltage fluctuations, they can be detected and corrected automatically. Automatic detection and correction are controlled by a delay control circuit (2) 4.

Next, the control method of the delay control circuit (2) 4 will be described.

Clock signals 57, 58 and 73 are inputted in the F/Fs 7, 8 and 9 in FIG. 2 are, respectively. The clock signal 58 inputs a signal later than the clock signal 73 by a delay equivalent to the delay 6, and the clock signal 57 inputs a signal even later than the clock signal 58 by 4 delay equivalent to the delay 5. Their phase relations appear as indicated by a, b and c in FIG. 3. In other words, the clock signal 73 corresponds to a, the clock signal 58 corresponds to b, and the clock signal 57 corresponds to c. The data signal 56 on which a delay adjustment has been completed is latched in the F/Fs 7, 8 and 9 by the clock signals 57, 58 and 73, respectively, and outputted as output signals 60, 61 and 62 of the respective F/Fs. A signal 68, which results from an exclusive OR performed on the output signals 60 and 61, is latched by the clock signal 58 in an F/F 12, which generates an output signal 64. Similarly, an output signal 66 is generated from an F/F 14 from the output signals 61 and 62. The signals 64 and 66 are inputted into the delay control circuit (2) 4; if the signal 64 is "1" i.e. if the values of data waveforms differ at positions a and b in FIG. 3 (e.g., if data is "0" at position a and data is "1" at position b, or if data is "0" at position a and data is "1" at position b), it indicates that the phase of the clock signal 58 is somewhat later than the phase of the data signal 56, which means that at worst there is a possibility that data be received correctly. As a result, the clock signal 58 is delayed (i.e., its phase is advanced) using the variable delay circuit 22. Alternatively, the data signal 56 is advanced (i.e., the delay amount is reduced) using the variable delay circuit 2. Similarly, if the signal 66 s "1," i.e., if the values of data waveforms differ at positions b and c in FIG. 3 (e.g., if data is "1" at position b and data is "0" at position c, or if data is "0" at position b and data is "1" at position c), it indicates that the phase of the clock signal 58 is somewhat earlier than the phase of the data signal 56, which means that at worst there is a possibility that data cannot be received correctly. As a result, the clock signal 8 is advanced (i.e., the delay amount is reduced) using the variable delay circuit 22. Alternatively, the data signal 56 is delayed (i.e., the delay amount is increased) using the variable delay circuit 2. If the processing is implemented on regular basis, it can cause an adverse effect on the transfer data due to influences from glitch noises caused during skew corrections. For this reason, fine skew adjustment controls should be performed once the completion of packet transfer is confirmed and when there is no transfer taking place. Of course, f there are no adverse effects, the fine skew adjustment control can be performed even during data transfer, since it will not cause any impediment to the transfer. Further, if both the signals 64 and 66 are "1" it indicates that the transfer data was not received correctly and an error processing, such as retrying the transfer, is implemented.

Although an example with a single-phase clock and data consisting of one signal is described for the sake of simplicity in FIG. 2, the present invention can be achieved by combining a plurality of similar circuits if data has a bus configuration of a plurality of bits.

Figure 9:
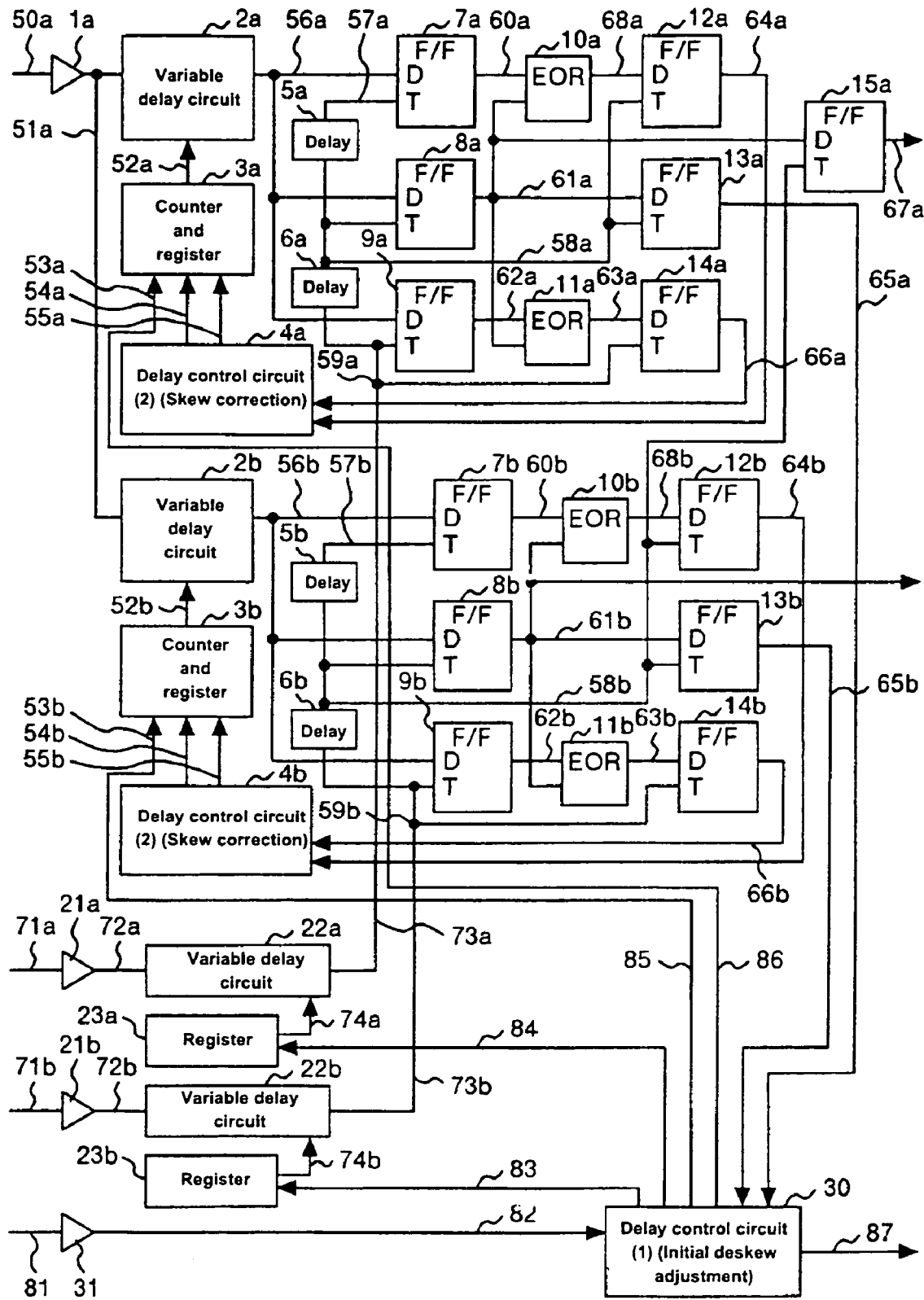
FIG. 9 shows a diagram of a two-phase clock parallel transfer-type deskew circuit in accordance with one embodiment of the present invention.

FIG. 9 is a diagram of a deskew circuit with a two-phase clock in accordance with another embodiment of the present invention. Next, the embodiment in FIG. 9 will be described below. In the embodiment in FIG. 2, the transfer speed of the clock 71 is required to be twice the transfer speed of the dab 50. As a result, when the clock and the data are transferred in parallel at high-speed, the transfer speed of the clock must be at high-speed, which makes a transfer in the backplane extremely difficult. For this reason, the clock is in two phases in the present embodiment so that transfers can take place with the clock at the same transfer speed as the data. For this, as indicated in FIG. 9, there are two sets each of variable delay circuits, a counter and register, F/Fs, delays, EORs and a delay control circuit (for skew correction) corresponding to clocks 71a and 71b. Further, since the phases of output data become different when received by a two-phase clock, a output signal 61a of an F/F 8a is relatched in an F/F 15a by a single clock 21b in order to match the phase of the output data to the clock 21b.

Figure 10:
FIG. 10 shows a diagram of deskew adjustment patterns for a two-phase clock in accordance with one embodiment of the present invention.
Figure 10:
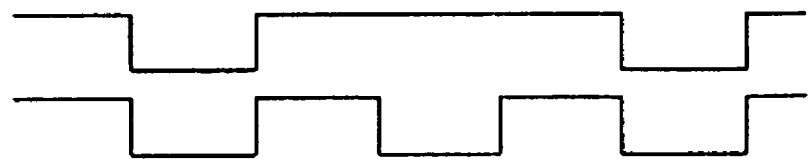
Figure 10:
Figure 10:
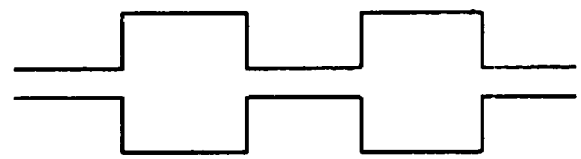

FIG. 10 indicates skew adjustment patterns and data transfer waveforms according to FIG. 9. During skew adjustments, a clock 21a and the clock 21b are transferred in the same phase while a skew adjustment takes place simultaneously. During normal data transfer, the clock 21a and the clock 21b are transferred in opposite phases.

The data transfer methods show in FIGS. 2 and 9 are embodiments in which the number of the clock transferred in parallel, of the data transferred, and of commands is the same.

Figure 11:
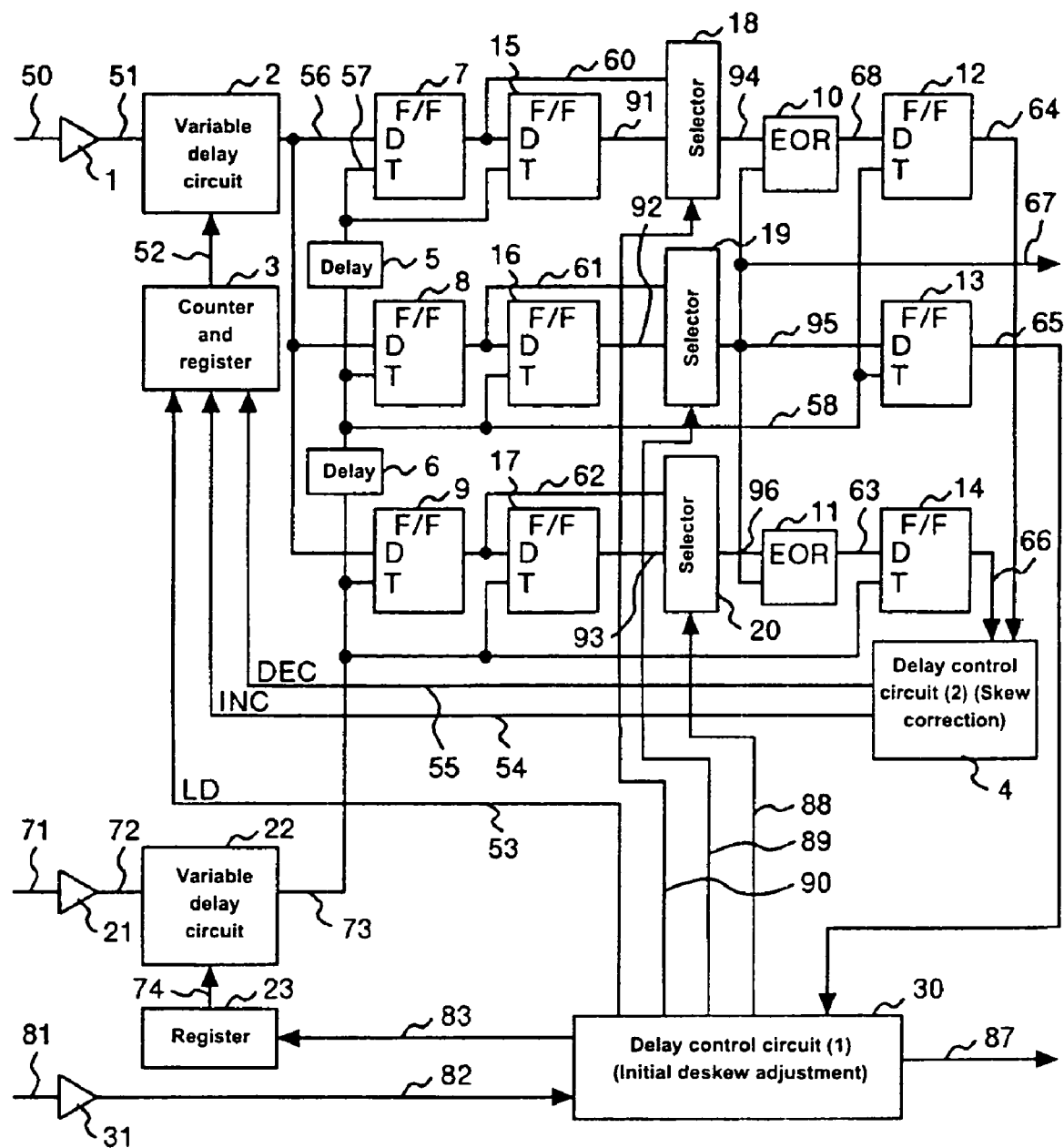
FIG. 11 shows a diagram of a deskew circuit that can make skew adjustments of two or more cycles of a clock in accordance with one embodiment of the present invention.

FIG. 11 indicates a diagram of a deskew circuit as another embodiment of the present invention when there are ore clocks than commands and data in a data transfer with a parallel transfer of the clocks. In FIG. 11, before beginning the transfer of command and data, a few cycles of clock signals is transmitted to remove jitters caused by the clocks' dependency on patterns. Additionally, after the data transfer is finished, a few cycles of the clocks is added and transferred until latches in F/Fs 7, 8, 9, 15, 16 and 17 for skew adjustment take place normally. In this way, the number of clocks transferred is made more numerous than the number of commands or data transferred in a data transfer with a parallel transfer of the clocks. Due to the fact that the deskew circuits in FIGS. 2 and 9 are circuits in which the number of commands, data and clocks transferred is the sam₁, the range of skew adjustments among commands, data and clocks transferred is narrow. Consequently, skew adjustments of more than one cycle of the clock cannot be made. On the other hand, the deskew circuit in FIG. 11 makes skew adjustments of up to two cycles of the clock possible by serially connecting the F/Fs 15, 16 and 17 in a succeeding stage to the F/Fs 7, 8 and 9 and by making it possible to select F/Fs in either the preceding or succeeding stage through selector circuits. In other words, if a skew is one cycle or less, signal lines 60, 61 and 62 are selected, and if a skew is more than one cycle but equal to or less than two cycles, signal lines 91, 92 and 93 are selected. Although only one stage of F/Fs is serially connected in a succeeding stage to the /Fs 7, 8 and 9, skew adjustments of more than two cycles of the clock can be made by increasing the number of stages of F/Fs connected serially. This makes data transfer in even higher speed possible.

By providing a variable delay circuit between a receiver that first receives data and an F/F that first latches the data, data that can be taken in is provided to the F/F after adjustment, which prevents the first stage F/F from entering a metastable state.

According to the embodiments o the present invention described above, a parallel transfer clock is supplied only when a data transfer is required, skew adjustments of two or more cycles of the clock is possible, and the present invention is applicable to multi-phase locks. Further, fine adjustments of skews after completing the transfer of the packet is possible; these features make the method according to the present invention superior to conventional methods.

As described above, in devices that require high-speed data transfer such as disk array devices, the present invention provides an effect of achieving a high data transfer through enhanced transfer frequency by performing deskew adjustments in data transfers in parallel with clock.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A disk array control device comprising:
    a channel adapter connected to a host computer,
    said channel adapter comprises;
    a channel control circuit receiving data from said host computer, and
    a deskew circuit receiving said data from said channel control circuit,
    wherein said deskew circuit comprises:
    a first receiver that receives data and is provided for each bit of a data bus composed of a plurality of bits,
    a first variable delay circuit that is provided with an output of the first receiver,
    a second receiver that receives a clock transferred in parallel with the data,
    a second variable delay circuit that is provided with an output of the second receiver,
    a first delay circuit that gives a first delay to an output of the second variable delay circuit, and
    a second delay circuit that gives a delay greater than the first delay to the output of the second variable delay circuit.

2. A disk array control device according to claim 1, wherein an output timing of the second variable delay circuit, a timing of the first delay circuit and a timing of the second delay circuit are within a window of time at an initial skew adjustment.

3. A disk array control device according to claim 1, wherein the setting value of the first variable delay circuit is adjusted after confirming a completion of a packet transfer.

4. A method of controlling a disk array which includes a channel adapter connected to a host computer, said method comprising the steps of:
    receiving by a channel control circuit data from said host computer; and
    receiving by a deskew circuit said data from said channel control circuit,
    wherein said deskew circuit comprises:
    a first receiver that receives data and is provided for each bit of a data bus composed of a plurality of bits,
    a first variable delay circuit that is provided with an output of the first receiver,
    a second receiver that receives a clock transferred in parallel with the data,
    a second variable delay circuit that is provided with an output of the second receiver,
    a first delay circuit that gives a first delay to an output of the second variable delay circuit, and a second delay circuit that gives a delay greater than the first delay to the output of the second variable delay circuit.

5. A method according to claim 4, wherein an output timing of the second variable delay circuit, a timing of the first delay circuit and a timing of the second delay circuit are within a window of time at an initial skew adjustment.

6. A method according to claim 4, wherein the setting value of the first variable delay circuit is adjusted after confirming a completion of a packet transfer.

7. A disk array control device comprising:
a deskew circuit receiving data from a host computer coupled to said disk array control device,
wherein said deskew circuit comprises:
a first receiver that receives date and is provided for each bit of a data bus composed of a plurality of bits,
a first variable delay circuit that is provided with an output of the first receiver,
a second receiver that receives a clock transferred in parallel with the data,
a second variable delay circuit that is provided with an output of the second receiver,
a first delay circuit that gives a first delay to an output of the second variable delay circuit, and
a second delay circuit that gives a delay greater than the first delay to the output of the second variable delay circuit.

8. A disk array control device according to claim 7, wherein an output timing of the second variable delay circuit a timing of the first delay circuit and a timing of the second delay circuit are within a window of time at an initial skew adjustment.

9. A disk array control device according to claim 7, wherein the setting value of the first variable delay circuit is adjusted after confirming a completion of a packet transfer.

10. A method of controlling a disk array control device comprising the steps of:
receiving by a deskew circuit data from a host computer coupled to said disk array control device,
wherein said deskew circuit comprises:
a first receiver that receives data and is provided for each bit of a data bus composed of a plurality of bits,
a first variable delay circuit that is provided with an output of the first receiver,
a second receiver that receives a clock transferred in parallel with the data,
a second variable delay circuit that is provided with an output of the second receiver,
a first delay circuit that gives a first delay to an output of the second variable delay circuit, and
a second delay circuit that gives a delay greater than the first delay to the output of the second variable delay circuit.

11. A method according to claim 10, wherein an output timing of the second variable delay circuit, a timing of the first delay circuit and a timing of the second delay circuit are within a window of time at an initial skew adjustment.

12. A method according to claim 10, wherein the setting value of the first variable delay circuit is adjusted after confirming a completion of a packet transfer.

* * * * *